(12) United States Patent
Hanninen et al.

(10) Patent No.: US 9,412,187 B2
(45) Date of Patent: Aug. 9, 2016

(54) DELAYED RENDERING OF CONTENT

(71) Applicant: Documill Oy, Espoo (FI)

(72) Inventors: Rami Hanninen, Espoo (FI); Mika Konnola, Espoo (FI); Terho Laakso, Espoo (FI)

(73) Assignee: DOCUMILL OY, Espoo (FI)

( * ) Notice: Subject to any disclaimer, the term of this patent is extended or adjusted under 35 U.S.C. 154(b) by 237 days.

(21) Appl. No.: 14/136,336

(22) Filed: Dec. 20, 2013

(65) Prior Publication Data

US 2015/0178248 A1    Jun. 25, 2015

(51) Int. Cl.
| | | |
|---|---|---|
| G06F 17/21 | (2006.01) | |
| G06F 17/22 | (2006.01) | |
| G06T 11/60 | (2006.01) | |

(52) U.S. Cl.
CPC ........................................ *G06T 11/60* (2013.01)

(58) Field of Classification Search
CPC .. G06F 17/211; G06F 17/218; G06F 17/2264
See application file for complete search history.

(56) References Cited

U.S. PATENT DOCUMENTS

| | | | | |
|---|---|---|---|---|
| 6,268,859 B1 * | 7/2001 | Andresen | ................ | G06T 15/40 345/421 |
| 6,708,309 B1 * | 3/2004 | Blumberg | ............ | H04N 1/2183 382/305 |
| 6,725,421 B1 * | 4/2004 | Boucher | ........... | G06F 17/30017 348/E7.071 |
| 7,600,183 B2 * | 10/2009 | Stern | ..................... | G06F 17/211 382/171 |
| 8,645,823 B1 * | 2/2014 | Thiess | ............... | G06F 17/30905 715/234 |
| 2002/0015042 A1 * | 2/2002 | Robotham | ................ | G06F 3/14 345/581 |
| 2005/0055420 A1 * | 3/2005 | Wyler | ............... | G06F 17/30905 709/217 |
| 2008/0050023 A1 * | 2/2008 | Feng | ......................... | H04N 1/41 382/232 |
| 2008/0222273 A1 * | 9/2008 | Lakshmanan | ..... | G06F 17/30247 709/219 |
| 2011/0016403 A1 * | 1/2011 | Shibukawa | ....... | G06F 17/30899 715/738 |
| 2011/0113323 A1 * | 5/2011 | Fillion | .................. | G06F 17/211 715/252 |
| 2013/0007603 A1 * | 1/2013 | Dougherty | .............. | G06T 11/60 715/251 |
| 2013/0038614 A1 * | 2/2013 | Dadi | ......................... | G06T 1/00 345/501 |
| 2014/0115445 A1 * | 4/2014 | Yano | ...................... | G06F 17/211 715/238 |
| 2014/0173393 A1 * | 6/2014 | Roy | ...................... | G06F 17/218 715/201 |
| 2014/0212057 A1 * | 7/2014 | Konnola | ................... | G06T 9/00 382/232 |
| 2014/0258371 A1 * | 9/2014 | Hammersley | ............. | G06F 8/41 709/203 |
| 2015/0279310 A1 * | 10/2015 | Itakura | .............. | G06F 17/30899 345/520 |

\* cited by examiner

*Primary Examiner* — Scott Baderman
*Assistant Examiner* — Mario M Velez-Lopez
(74) *Attorney, Agent, or Firm* — Young & Thompson (57) ABSTRACT

The invention relates to a computer implemented method for preparing content of a document, wherein a document file is received as an input, the content of the document file is parsed, the parsed content data items forming the content of the document file are classified into at least two separate categories. Further, within the method at least one of the following is performed for the classified parsed content data items: rendering the content data items classified in a first category into a raster canvas and storing the rendered content of the raster canvas into a raster image file, generating and storing a meta file comprising at least one preprocessed rendering instruction for at least one content data item classified in a second category. The invention also relates to a system configured to perform the method and a non-transitory computer readable medium storing computer program code.

18 Claims, 5 Drawing Sheets

DELAYED RENDERING OF CONTENT

TECHNICAL FIELD

The invention concerns in general the technical field of data processing. Especially the invention concerns preparation of content for visualization.

BACKGROUND OF THE INVENTION

The tremendous increase in utilization of computers and mobile terminals in the representation of documents has established a development of applications for displaying the documents in terminal devices. In addition to the development of viewer applications for terminal devices one area of development is preparation of documents, and especially content of the documents, applicable for storing, delivery and displaying in the terminal devices.

The preparation of the content of a document relates to rendering of document content for online previewing and viewing purposes. The goal is to find optimal rendering mechanism and viewing format satisfying limitations regarding storage of prepared content, delivery of the content to terminal device and displaying the content with satisfying accuracy. Moreover, there is need to provide textual content in the terminal device so that it cannot be copied, which then enables the copyright protection to such material wherein it is needed. For viewing purposes so called compressed raster images are the easiest way to ensure accurate visual output, and viewing them in the terminal device requires only image decompression and displaying capabilities available practically in every terminal device nowadays. However, due to different use cases of documents, and related functions such as zooming of content, and different terminal screen sizes there often is need to prepare multiple raster images with variety of resolutions in order to satisfy all requirements. This, in turn, increases need of storage capacity for storing the different versions of prepared raster images. In practice, this is extremely challenging to arrange especially in cases where millions of documents need to be prepared in the described manner for previewing and viewing purposes. This is especially true in systems with large user base wherein simultaneous preparation, distribution and delivery of content to terminal devices must be arranged to be sufficiently fast in order to provide good end user experiences.

Therefore, there is need to find and introduce a solution which solves the problem of balancing high quality output with minimal storage requirements.

SUMMARY OF THE INVENTION

An objective of the invention is to present a computer implemented method, a system and computer program code stored in non-transitory computer readable medium for preparing content in a manner that at least partly balances the quality of the output with minimal storage requirement. Another objective of the invention is that the method, the system and the computer program code introduce solution for preparing the content in a manner that utilization of the resources in the system are optimized.

The objects of the invention are reached by computer implemented method, system and computer program code as defined by the respective independent claims.

According to first aspect, a computer implemented method for preparing content of a document is provided wherein the method comprises receiving a document file as an input; parsing the content of the document file; classifying parsed content data items forming the content of the document file into at least two separate categories; and within the method at least one of the following is performed for the classified parsed content data items: rendering the content data items classified in a first category into a raster canvas and storing the rendered content of the raster canvas into a raster image file; generating and storing a meta file comprising at least one preprocessed rendering instruction for at least one content data item classified in a second category.

The method may further comprise rendering data stored in the meta file comprising the at least one preprocessed rendering instruction for the at least one content data item classified in the second category in response to a request from an external entity. The raster image file comprising the rendered content data items classified in the first category and the rendered meta file may be outputted in one of the following manner: single raster image, layered separate raster images, raster image and textual and lineart content expressed with HTML, CSS and web font files.

The method may further comprise delivering at least the generated meta file to an external party requesting it for rendering.

The classification of the parsed content data items forming the content of the document file into at least two separate categories may be at least partly based on an analysis of a graphical complexity of each of the parsed content data items.

The at least one preprocessed rendering instruction for the metafile may be created by reducing the amount of information of the content data items in the second category that is needed to express the graphical representation so that all used coordinate values are converted to destination raster pixel coordinate values.

According to second aspect, a system for preparing content of a document is provided the system comprising one or more processors; a memory including computer program code; wherein the memory and the computer program code configured to, with the processor, cause the system at least to perform: receive a document file as an input; parse the content of the document file; classify parsed content data items forming the content of the document file into at least two separate categories; and wherein the system is configured to perform at least one of the following for the classified parsed content data items: render the content data items classified in a first category into a raster canvas and store the rendered content of the raster canvas into a raster image file, generate and store a meta file comprising at least one preprocessed rendering instruction for at least one content data item classified in a second category.

The system may further be configured to render data stored in the meta file comprising the at least one preprocessed rendering instruction for the at least one content data item classified in the second category in response to a request from an external entity.

The system may further be configured to output the raster image file comprising the rendered content data items classified in the first category and the rendered meta file in one of the following manner: single raster image, layered separate raster images, raster image and textual and lineart content expressed with HTML, CSS and web font files.

The system may further be configured to deliver at least the generated meta file to an external party requesting it for rendering.

The system may be configured to base the classification of the parsed content data items forming the content of the document file into at least two separate categories at least partly on an analysis of a graphical complexity of each of the parsed content data items.

The system may be configured to create the at least one preprocessed rendering instruction for the metafile by reducing the amount of information of the content data items in the second category that is needed to express the graphical representation so that all used coordinate values are converted to destination raster pixel coordinate values.

According to third aspect, a non-transitory computer readable medium for storing computer program code is provided that, when executed by a system, causes the system to perform a method for preparing content of a document comprising receiving a document file as an input; parsing the content of the document file; classifying parsed content data items forming the content of the document file into at least two separate categories; and within the system at least one of the following is performed for the classified parsed content data items: rendering the content data items classified in a first category into a raster canvas and storing the rendered content of the raster canvas into a raster image file, generating and storing a meta file comprising at least one preprocessed rendering instruction for at least one content data item classified in a second category.

The execution of the computer program code may cause the system rendering data stored in the meta file comprising the at least one preprocessed rendering instruction for the at least one content data item classified in the second category in response to a request from an external entity. The execution of the computer program code may cause the system outputting the raster image file comprising the rendered content data items classified in the first category and the rendered meta file in one of the following manner: single raster image, layered separate raster images, raster image and textual and lineart content expressed with HTML, CSS and web font files.

The execution of the computer program code may cause the system delivering at least the generated meta file to an external party requesting it for rendering.

The execution of the computer program code may cause the system at least partly to base the classification of the parsed content data items forming the content of the document file into at least two separate categories on an analysis of a graphical complexity of each of the parsed content data items.

The execution of the computer program code may cause the system to create the at least one preprocessed rendering instruction for the metafile by reducing the amount of information of the content data items in the second category that is needed to express the graphical representation so that all used coordinate values are converted to destination raster pixel coordinate values.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION

Figure 1:
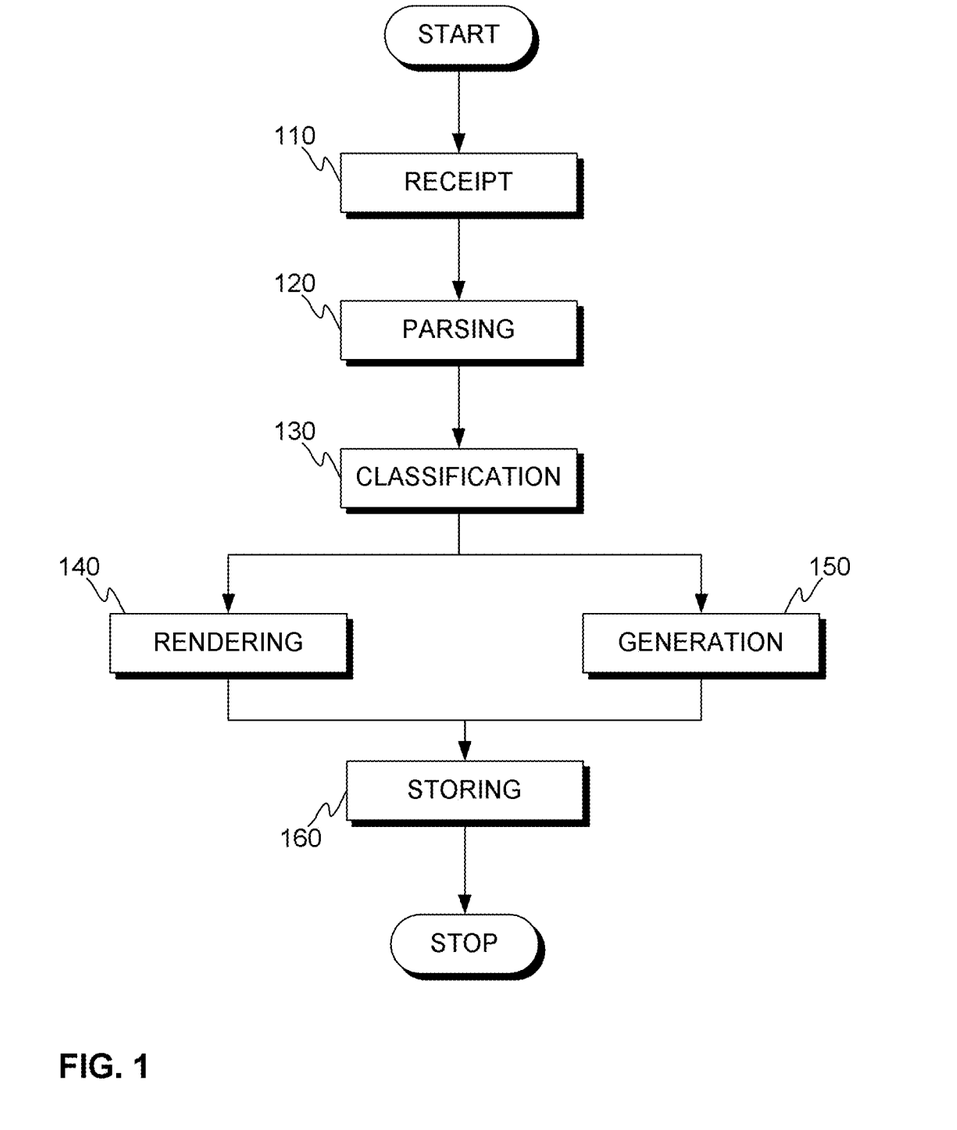
FIG. 1 illustrates an example of the method according to the invention.

The invention relates to a computer implemented method wherein content of a document is prepared for displaying purposes. The prepared content is stored in a system from where it is to be delivered or downloaded in a terminal device. An example of the method is illustrated in FIG. 1.

In the method at least a document file comprising content is received 110 as an input in the system. The system may receive the document file from any third party system either automatically or in response to a request. The request may be initiated by the system to a third party system either automatically or in response to a request received from a terminal device either in the system or in a third party system. The requested document file, or at least part of the content of the document file, is configured to be delivered though the system according to the invention, which system is configured to prepare the content, as will be explained in the following.

In the next step the content of the document file is parsed 120. The parsing comprises operations by means of which the content data items within the received document can be identified and extracted. For example, the document file may comprise, shapes, effects, fills, raster graphics images i.e. bitmaps and glyphs and font data relating to textual content of the document, which are herein referred as content data items. The font data may either embedded in the document file or an external font file to be downloaded.

According to the example of the invention the parsed content data items forming the content of the document file are configured to be classified 130 into at least two separate categories. The classification may be performed by analyzing parsed content data items, or some specific part of the parsed content data items, according to predetermined rules defined in the system. The analysis may e.g. be a comparison of two data values, the first of which originating and determined from the parsed content data item and the second of which is a comparison data value defined in the system. According to an example of the invention the first data value may be compared with one or more comparison data values defined in the system. The outcome of the comparison, and thus the analysis, is information if the compared data values match or not and thus it produces classification information for each of the parsed content data items.

Generally speaking the predetermined rule or rules comprise necessary information by means of which the system may classify the parsed content data item or items to at least two categories for further processing according to the invention. The classification of a content data item into a certain category may be indicated by adding an indicator to each parsed content data item or storing the parsed content data item or items in corresponding memory spaces defined in the system.

The classification to different categories may be at least partly based on an analysis of a graphical complexity of each of the parsed content data items, and thus on an determination of a processing requirements for a content data item. For example, such content data items which are complex to process are classified into the first category and such content data items which are simple to process are classified to a second category. According to an example of the invention content data items that can be easily and efficiently expressed in vector form can be considered as simple ones and thus classified into the second category, while all remaining content data items are considered as complex ones and thus classified into the first category. Thus, the classification of content data items to simple and complex entities is based on how easy and efficient it is to express the entity information as a sequence of a few simple data fields. This principle is in line with the specific goal of the invention to retain high-resolution visual information in dense and quickly renderable form. Anything else that cannot be encoded with just a few bytes of data is considered to take too much space in media stream to be stored, and also to take too long to read and render afterwards.

Next, some examples of what may be required from graphic entities for them to be considered "simple" are introduced:

- Associated area and line paints must be simple solid colors in well-defined color spaces, as anything else (textures, complex gradients and so on) contain a lot of information that is hard to encode and render.
  - A "simple color" is any color that can be unambiguously expressed with a few parameters (often 3) relative to some color model, like sRGB, XYZ, or DeviceCMYK. A color model then interprets the parameters to physical light human eye then perceives as particular color.
  - A simple color may optionally be associated to an additional translucency ("alpha") parameter, and all such colors are considered "simple", too.
  - Another important characteristic of a simple color is that it is invariant with respect to the position the color appears within the surface (or volume) of a shape. The term "solid" is often used to emphasis this invariance.
  - Some examples of colors that are not simple solid colors are gradient or texture paints that specify some function that maps different points on shape surface to different colors.
  - It is also worth noting that when a surface painted with a simple solid color is rendered, the rendering result does not need to be uniform in color, because the result may be affected by any number of position dependent rendering effects, including, but not limited to anti-aliasing, blending, and lightning.
  - General rule may be that any paint that can be unambiguously expressed with just a few parameters and a reference to a well-known color space is considered to be "simple", as those parameters (and the reference) are easy and economical to store and process. All paints that require more than a few parameters to express themselves are considered to be "complex".
- Associated line strokes must be simple solid or dashed lines, as anything else (shaped dashes, multiple parallel lines and so on) contain a lot of information that is hard to encode and render.
  - A "simple stroke" is any definition of a shape outline visual decoration that can be expressed with just a few parameters. Typical simple strokes are defined just by line width, and some enumerated values that define how the outline decoration behaves when outline segment joins another segment, or ends. Somewhat more complex strokes that may be considered to be "simple" are dashed strokes that extend the number of required parameters with a few values that specify the lengths of segments that are stored, and those that are not.
  - Examples of strokes that are not simple are strokes where the decoration applied on shape outline involves anything but a single straight line, possibly dashed.
  - General rule may be that any stroke that can be unambiguously expressed with just a few parameters and that expected target rendering system natively supports is considered to be "simple", as those parameters are easy and economical to store, and corresponding shapes are fast to render. All strokes that require more than a few parameters to express themselves, or not natively supported by expected rendering environment are considered to be "complex".
- Associated line geometries must be simple lines and splines, as anything else (self-crossing shapes, excessive number of vertices and so on) contain a lot of information that is hard to encode and render.
  - A "simple shape" is any definition of a shape outline that can be expressed with fewer parameters than what corresponding raster image representation would take. Typical simple outlines are defined just by a few vertices, and possible by a few additional segment type and spline curve parameters.
  - Some shape vector forms may however also be extremely costly. This happens if the shape outline is defined with excessive detail, relative to the intended purpose. For example, consider a shape that represents the coastline and borders of United States, expressed with one meter accuracy. Such accuracy is several magnitudes too fine if the shape will just be displayed as 1 inch wide logo at the corner of some document.
  - With a given backdrop raster of given resolution, any shape that requires less (uncompressed) data to express itself than what the (uncompressed) pixels on the area the shape covers on the backdrop raster would take is "simple", and can be kept in vector form. Any shape geometries that require more data to express themselves are "complex".
- The blending and clipping context the entity is rendered with must also comprise basic color blend and simple clip operations, as anything else (PDF blend modes like ColorDodge and HardLight, PDF soft mask clip modes with translucent clip rasters and so on) contain a lot of information that is hard to encode and render.
  - A blending operation is "simple" if it is based on any of the classical Porter and Duff blending equations.
  - A clipping operation is "simple" if the corresponding clip operations have hard edges, and the clipping shape itself is "simple", as defined earlier.
  - If current composite and clip objects are "simple", the rendering context is "simple", otherwise it is "complex", and all graphics entities rendered in that context become also "complex", even if they themselves would be "simple".

Raster images in this context are considered to be simple geometrical shapes (squares) filled with complex paints (textures), and therefore raster images are always considered to be "complex" entities which are always immediately rendered to a so called backdrop image.

In the following at least part of the general rules as introduced above are described with objects implemented with Java programming language:

- Associated area and line paints must be simple solid colors in well-defined color spaces, as anything else (textures, complex gradients and so on) contain a lot of information that is hard to encode and render. This can be determined with Java language so that simple solid colors are recognized simply by testing if the corresponding java.awt.Paint objects are in fact of java.awt.Color type (paint instance of java.awt.Color). If it is, the paint is "simple", otherwise it is "complex".

Associated line strokes must be simple solid or dashed lines, as anything else (shaped dashes, multiple parallel lines and so on) contain a lot of information that is hard to encode and render. This can be determined with Java language so that simple solid or dashed strokes are recognized simply by testing if the corresponding java.awt.Stroke objects are in fact of java.awt.BasicStroke type (paint instance of java.awt.BasicStroke). If it is, the stroke is "simple", otherwise it is "complex".

Associated line geometries must be simple lines and splines, as anything else (self-crossing shapes, excessive number of vertices and so on) contain a lot of information that is hard to encode and render. This can be determined with Java language so that line geometries are recognized simply by testing if the corresponding java.awt.Shape objects are in fact of java.awt.Path2D, java.awt.Rectangle2D, java.awt.Line2D, or java.awt.Point2D type (paint instance of java.awt.Path2D, and so on). If it is a Rectangle2D, Line2D, or Point2D, the shape is automatically "simple". If it is Path2D, the number segments the shape comprises can be tested with java.awt.geom.PathIterator: if the number of segments is below some predetermined threshold (like 100), the stroke is "simple", otherwise it is "complex". Additional, more geometrically involved tests may be used to see if the shape outline crosses itself, and if it does, the shape is "complex". If the shape is of some other type, it is "complex".

The blending and clipping context the entity is rendered with must also comprise basic color blend and simple clip operations, as anything else (PDF blend modes like ColorDodge and HardLight, PDF soft mask clip modes with translucent clip rasters and so on) contain a lot of information that is hard to encode and render. This can be determined with Java language so that simple blending and clipping contexts are recognized simply by testing if the corresponding java.awt.Composite and java.awt.Shape objects, as determined by java.awt.Graphics2D object getComposite and getClip methods, are in fact of java.awt.AlphaComposite type (composite instance of java.awt.AlphaComposite), and a "simple" clip shape, subject to the same classification as other shapes types. If current composite and clip objects are "simple", the rendering context is "simple", otherwise it is "complex".

Raster images in this context are considered to be simple geometrical shapes (squares) filled with complex paints (textures), and therefore raster images are always considered to be "complex" entities which are always immediately rendered to DMF backdrop image.

Generally speaking, text and diagrams (blocks, lines, other informative elements) often are associated to simple colors, strokes, geometries, and rendering contexts only, so the "simplicity" of graphics entities often correlates well between all aspects of "simple", informative entities. On the other hand, complex elements tend to be decorative, carrying little actual information, and therefore it rarely matters if some details of these complex decorative elements are lost due low backdrop resolution and lossy compression.

Now, as the content data items i.e. graphics entities are classified into different categories there are arranged different processing mechanisms for each of the entities according to an example of the invention. The content data items classified into the first category are determined to be complex graphic entities and they are configured to be rendered 140 into a raster canvas as a whole. As a result, for example only complex shapes, complex effects, complex fills and raster images are rendered to the raster canvas. By means of this it is possible to reduce the area needed, because the bounds of the area covered by complex shapes may be smaller than the area covered by all shapes. It is also possible to create a shareable separate file comprising information of content data items of a certain type. Also, in case the raster image turn out to be empty i.e. it contains no information it can be omitted from the deliverables.

Additionally, pages may be surrounded with blank margins that contain no markings. Pages may also be only partially filled with content, leaving for example the bottom half of the page completely blank. Cropping these blank edges out may reduce the number of pixels to be saved into a file significantly, while leaving no meaningful content out. This will reduce the exported back-drop image file size, even when the image is encoded with efficient image compression, because compression will always need some overhead to express blank areas. It will also optimize the amount of memory required when uncompressing and handling the compressed back-drop image.

The rendered raster image typically comprises the following characteristics:
  Contains no glyphs
  Resolution can be low (and upscaled when needed)
  Compression can be lossy (no content present sensitive to compression artifacts)
  Pixel count depends on content bounding box
  Omitted if no complex graphics present on page
  Repeating background may be shared by multiple document pages The content data items classified in the second category are the simple graphic entities which are configured to be processed so that a meta file comprising at least one preprocessed rendering instruction for at least one content data item in the second category is generated 150. The aim of the preprocessing is to generate a compact meta file comprising rendering instructions for the content data items classified in the second category so that the meta file comprising the preprocessed instruction can be stored in a compact memory space which is smaller than the content data items of the second category if they would be rendered in the raster canvas together with the content data items in the first category. Additionally, the preprocessed rendering instructions provide an advantage over the other solutions as the instructions in the meta file are generated as resolution independent data, which enables creation of the content in the second category in any resolution when the content is requested and/or delivered to the terminal device. Thus, there is no need to store multiple versions of the content in the system.

During the generation phase the amount of information of the content data items in the second category that is needed to express the graphical representation may be reduced by converting all used coordinate values to destination raster pixel coordinate values in pre-processing phase. The resulting coordinate values therefore do not need to be transformed by any affine matrix operations or similar after that. Since the destination coordinate system is a discrete raster array known by the system, the coordinate values may also be rounded to closest integer values without noticeable rounding errors. This means that the coordinate information may be encoded efficiently into meta file byte stream, and also later read and rendered efficiently.

For example, the following operations may take place during the generation phase when the content data items classified in the second category are preprocessed:

Simple/complex content mutual occlusion: When during meta file generation input graphics content, i.e. the content data items, is classified to "simple" and "complex" elements, it may happen that a "complex" graphical element that is processed after some earlier "simple" element occludes it partially or completely. When that happens, the parts of the "simple" element that the "complex" element covers must be reclassified as being "complex", otherwise their mutual visual in-front-of/behind-of order would be reversed. A typical example would be a simple filled black square, followed by a smaller raster image that occupies the center of the square, making the overflowing parts of the back square appear as black borders for the image. Without simple/complex element occlusion monitoring, the simple black square would be directed to meta file vector graphics stream, while the raster image would be directed to meta file raster backdrop image, which at later rendering phase would then completely hide the raster behind the square. If a "complex" element occludes text, the occluded text may either be rendered to backdrop, or processed normally, in which case text that was supposed to be hidden behind some "complex" element will jump forward and become visible. In preview context, this may often be acceptable.

Vertex-rich geometry simplification: Shapes with excessive number of vertices may either be treated as "complex" graphics elements that are rendered directly on meta file backdrop image, or simplified by replacing the geometry with another that just approximates the original outline, but with notable fewer vertices. The choice depends on individual edge segment length relative to backdrop raster pixel dimensions, the area the shape occupies, and the expected resolution range the meta file representation is expected to be later rendered to. A vertex-rich geometry that would cover a large and otherwise blank area is can be efficiently represented as a "simple", vertex-reduced version, while corresponding shape that would occupy only a small area, or area already marked by other complex, is efficiently represented by treating it as a "complex" area. A very throughout implementation would consider the combined effect of all shapes before making the decision.

Replacing embedded font data and references with references to full, shared fonts: If input refers to input document specific embedded fonts, those fonts need to be kept around for later rendering. This consumes both space and processing power, as the embedded fonts need to be stored, and later read in just to satisfy the needs of one particular document. Storing and later reading of embedded font resources may however be avoided if meta file pre-processor has access to corresponding general use full fonts. Recognizing which full font each embedded font is derived from may be based on font signatures, names, and as a last resort to the similarity of glyph shapes and metrics. If an embedded font is recognized as being derived from some full font, the embedded font need not to be stored, which saves space and processing effort, assuming that the recognized full font can be expected to be available later when final graphics output is rendered. Additionally, if embedded font uses different character or glyph encoding scheme than the corresponding full font, corresponding text encoding must be changed to match the full font encoding so that the corresponding text can later be reliably rendered with the full font.

More precisely, in the generation of the meta file the emphasis is on simplicity, small footprint, and enabling fast and streamable rendering. The aim is to achieve dense, specific and simple binary data representation wherein element positions, sizes, style details (such as font size and baseline offset) are expressed with fully resolved values. The meta file may comprise Unicode characters, pre-resolved font specific shaped glyphs (e.g. for Arabic and other similar languages), simple text formatting (such as font, size, color), simple graphics shapes and effects, references to external resources (such as rasters, fonts, sub-metafiles), simple structure markers (such as begin/end of chapter, paragraph, line, field) and simple annotations (such as comments or hyperlinks). The preprocessed rendering instructions in the meta file comprise an effective "recording" of what would have been drawn if content had been rendered to a raster immediately with metadata to preserve content semantic structure, which may be easily and efficiently rendered ("playback") to a raster image of chosen resolution, or to an alternate vector representation (HTML, SVG, PDF, . . . ) when needed. The rendering of the meta file may happen before delivering the content to the terminal device or after the delivery. In the first case the final rendering is performed in the system, such as in a server, but in the latter case in the terminal device. If the rendering happens in the terminal device all referred resources in the meta file need to be transferred there, too. The final rendering of the meta file may be arranged to happen in response to a request of the content by the terminal device, for example.

At least some characteristics of the meta file may be the following:
It stores unshaped glyphs as Unicode text,
It stores shaped glyphs as glyph vectors,
It stores simple shapes as coordinate sequences,
Size depends on the number of characters and shape vertices,
Typical size of text-heavy page content after compression (LZ4): 5 kB per page.

With the meta file comprising one or more preprocessed rendering instructions for at least one content data item in the second category it is possible to render the content data, i.e. the objects, with a desired resolution even though the pagination, and any other layout determination, is already performed. If the resolution of the rendered content data in the second category does not match with the already rendered background image, the background raster image is then scaled to match with the resolution of the rendered content data in the second category.

Structurally, meta file according to the present invention may comprise a densely packed byte stream (as opposed to verbose XML) that comprises a short header, and a sequence of records of arbitrary length. The header may specify the file type and format version, and type and version specific additional data. Each record may specify record type and type specific data, which are also encoded in file type and format version specific way. For example, a record that defines one line would comprise a type code that tells the record specifies a line, followed by line begin and end point X and Y coordinates. The byte stream may be constructed either incrementally during meta file generation, or in one bulk operation after all other processing has ended. The stream may be composed by expressing meta file header and content as unambiguous byte sequences, then concatenating them into a single sequence of bytes.

In some cases it may happen that the received document file does not comprise such content that there ends up content data items in all of the categories i.e. the first and the second categories in this case. Then, the computer implemented method may be configured to perform the further steps of the method only to the content i.e. content data items determined from the received document file. Thus, at least one of the following steps is performed: rendering 140, generation 150. Especially, in some implementations at least the generation 150 of the meta file is performed.

Finally, according to the example of the invention at least one of the following is configured to be stored in a memory of a system: raster image file comprising the rendered content of the raster canvas, the meta file comprising at least one preprocessed rendering instruction for at least one content data item classified in the second category. The storing may be arranged in such a manner that the system is configured to link the created raster image file and the meta file together if both exits. Thus, when the files are to be delivered to a terminal device, the system proceeds accordingly with both of the files.

In FIG. 1 it is illustrated that the rendering step 140 and generation step 150 are performed at least partly concurrently in the system. In some example of the invention the mentioned steps are performed sequentially in any order if both steps are performed. This may be the case when the system that is configured to perform the method according to the invention comprises limited computing resources reserved for the method.

Figure 2:
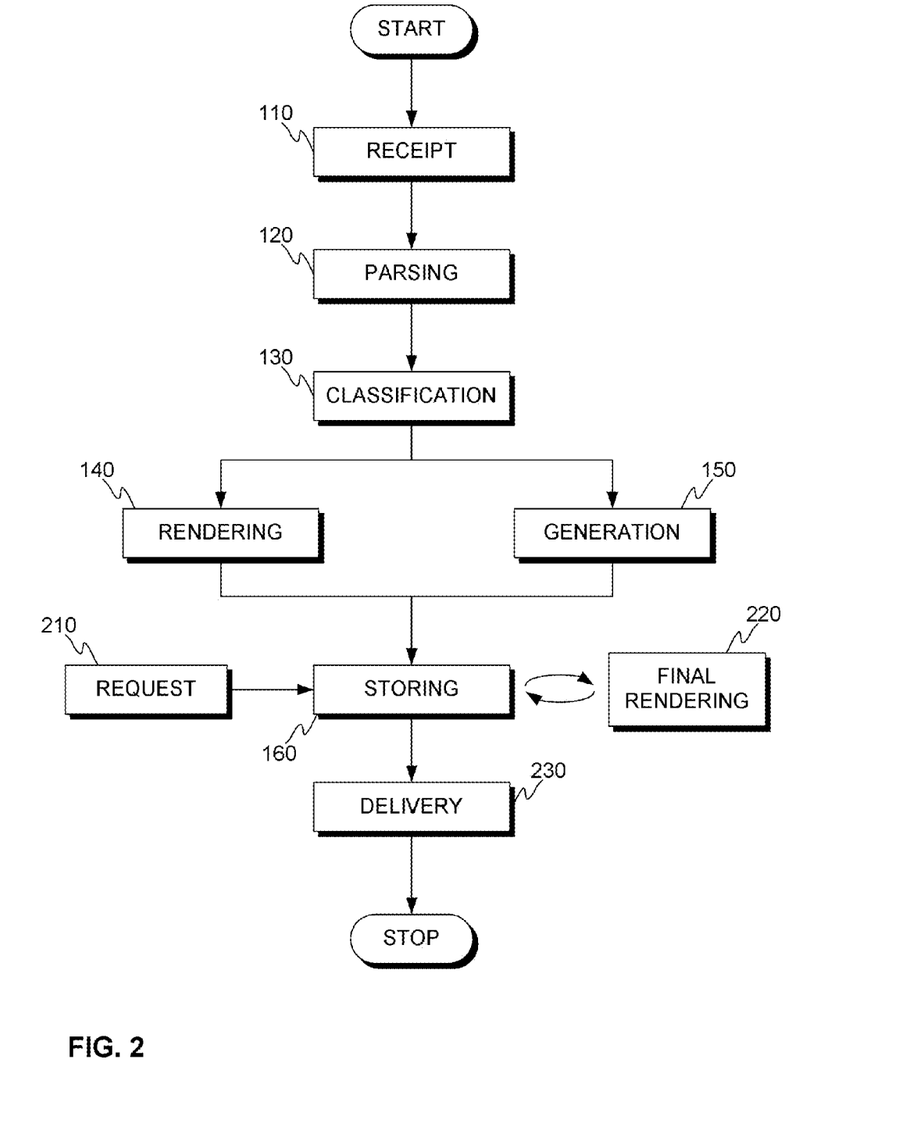
FIG. 2 illustrates another example of the method according to the invention.

FIG. 2 illustrates the computer implemented method according to an example of the invention wherein the prepared content is finalized in the system e.g. in response to a request for delivery by an external entity. Steps 110, 120, 130, 140, 150 and 160 comply with the description above. Next, the system receives a request 210 from an external entity, such as from a terminal device, whereto the content of the document file is requested to be delivered. The system is configured to access to a memory storing the raster image file and the meta file. In response to the request the system is configured to perform final rendering 220 of the meta file according to the instructions stored in it and after the final rendering the resulting raster image file from the meta file may be stored in the memory of the system. Finally, the requested content is delivered to the terminal device, or any other requesting entity.

In some other implementation, which is not illustrated in FIG. 2, the system may be configured to deliver at least the generated meta file to an external party, such as to a terminal device, for rendering. The delivery may be initiated in response to a request or to a predetermined triggering event defined in the system. The delivery may also comprise transmitting any other stored data file, such as a raster image file, to the external party.

Figure 3:
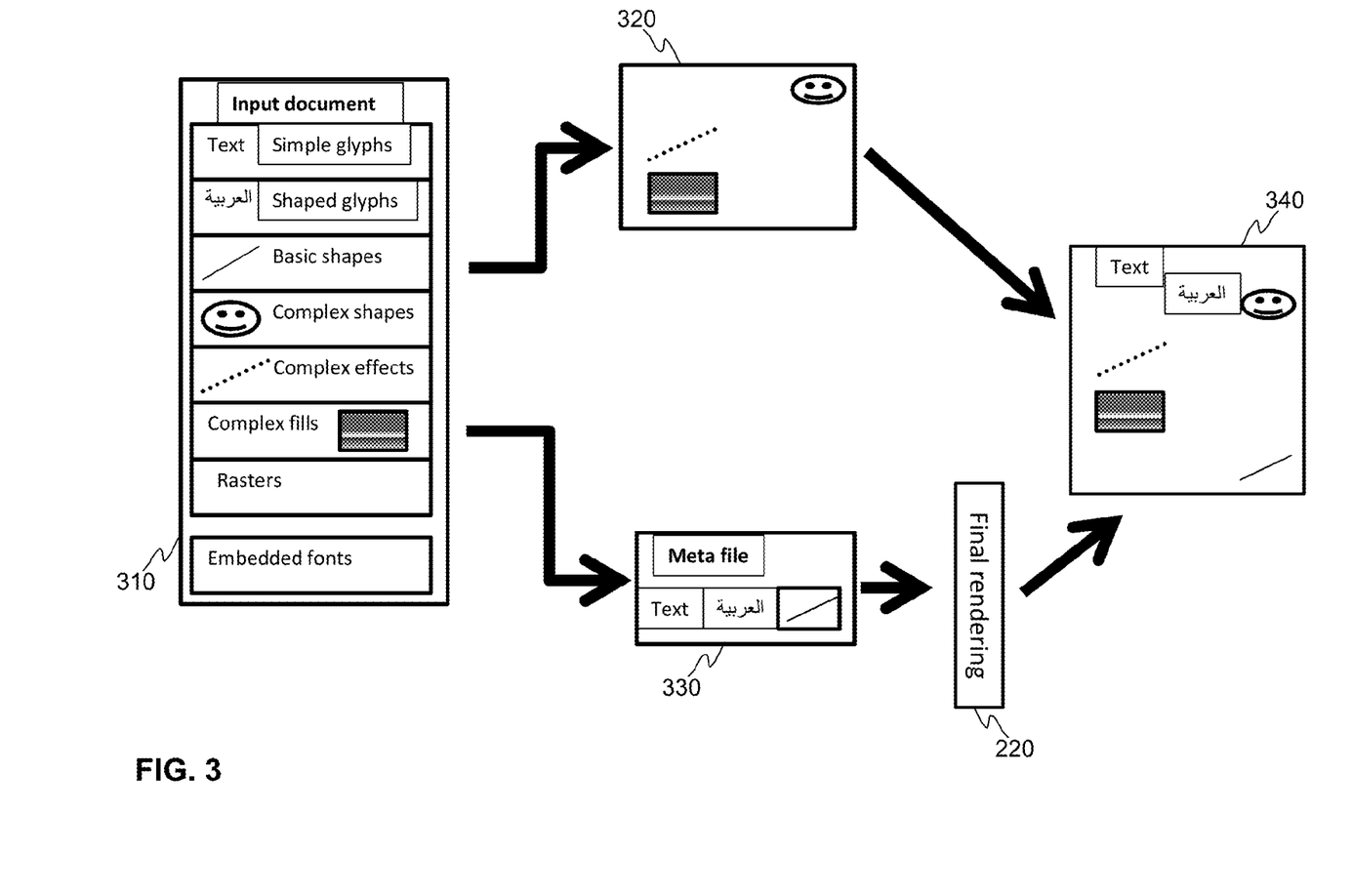
FIG. 3 illustrates a further example of the invention in a more illustrative manner.

FIG. 3 illustrates an example of the invention in a flow chart type manner. An input document 310 is received in the system. The document may comprise multiple types of content data items, such as simple glyphs, shaped glyphs, basic shapes, complex shapes, complex effects, complex fills, rasters and fonts (either embedded or from a downloadable external font file (not illustrated in FIG. 3)). The content data items are classified into first category comprising complex content data items, such as complex shapes, complex effects, complex fills and/or rasters, and into at least one second category comprising simple content data items, such as simple glyphs, shaped glyphs and/or basic shapes. The content data items in the first category are rendered by the system and a raster image file 320 is created. The content data items in the second category are preprocessed and a meta file 330 comprising preprocessing rendering instructions are created. The final rendering 220 to the content of the meta file 330 is configured to be performed e.g. in response to a request of the document file from an external entity and the final document 340 to be outputted is created.

If the parsing does not produce content data items in both of the categories, it may be arranged that only rendering or generation step is performed to the content existing.

Figure 4:
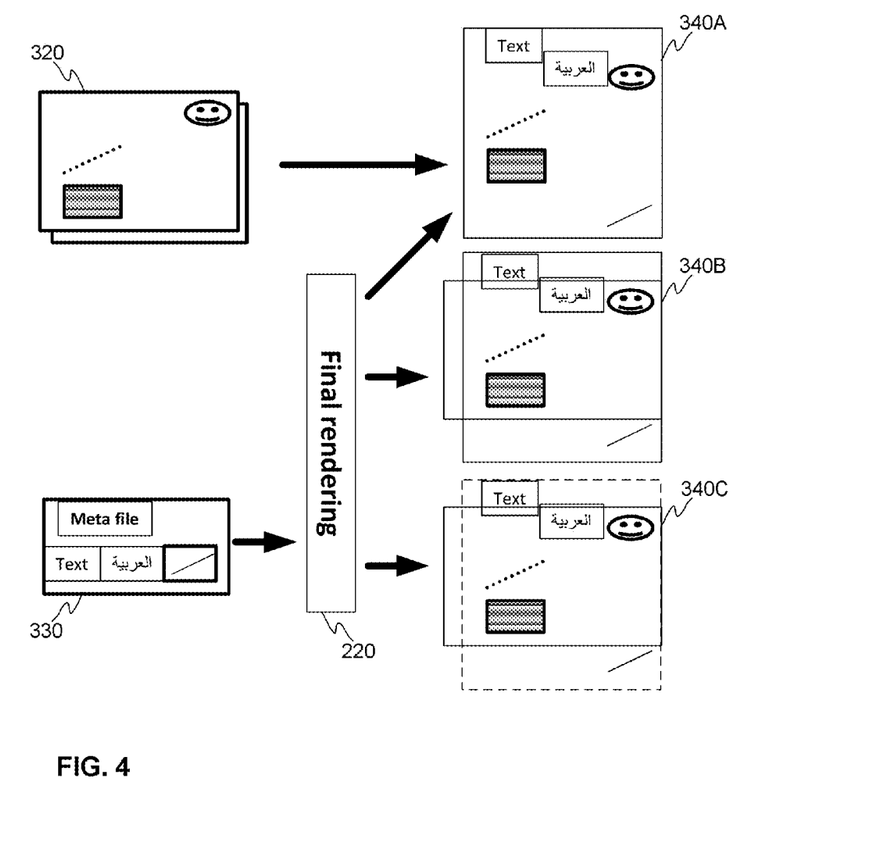
FIG. 4 illustrates various output possibilities according to the invention.

The present invention also provides various output possibilities, which are illustrated in FIG. 4.

According to a first example the stored raster image file 320 and the content in the meta file may be combined in a single raster image 340A. This can be achieved by configuring the final rendering 220 for the content of the meta file 330 to be performed so that the contents of the raster image file 320 and the rendered content of the meta file together are outputted into a single raster image file.

According to a second example of the invention the raster image file 320 and the rendered contents of the meta file 330 are configured to be outputted as layered images 340B in which the raster image file containing the rendered complex objects forms the background image and the image created from the preprocessed rendering instructions stored in the meta file is arranged to be set on top of the background image. The image on top is configured to be partially transparent in order to make the content of the background image visible to the viewer.

According to a third example the output content may be created from the several pieces of information i.e. on top of the raster image file 320 containing the rendered complex objects it is configured to be added a layer of textual and lineart content expressed with HTML, CSS and web font files, which are built on the basis of the content data items preprocessed and stored in the meta file 330.

Any of the described output methods and files may be delivered to the terminal device or downloaded by the terminal device.

Again, FIG. 4 illustrates that both the raster image file 320 and the meta file 330 exists and comprise content data items defined in the parsing step. However, this is not necessarily the case as described above.

Figure 5:
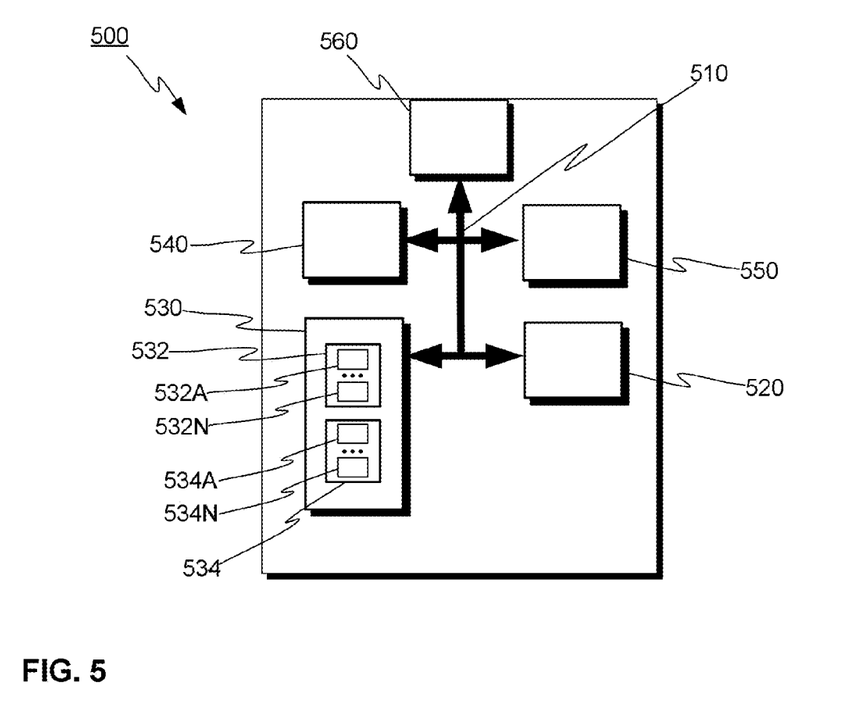
FIG. 5 illustrates a system according to an example of the invention.

The invention also relates to a system which is configured to implement the method as described above. A system according to an example of the invention is illustrated in FIG. 5. The system 500 comprises, for example, a bus 510, a processor 520, a memory 530, input means 540, output means 550, and a communication interface 560. The bus 510 may include means or methods that enable communication among the elements of the system 500. The system may comprise, or be implemented by, one or more servers, one or more desktop computers, one or more laptop computers, one or more tablet computers, one or more mobile communication terminals or one or more special hardware devices as long as it is capable of implementing the method according to the invention. Thus, in principle any computing device, which comprises necessary hardware and computer program code stored in a memory, may be configured to implement the method as described.

The processor 520 may comprise one or more conventional processors, one or more microprocessors, or one or more processing logics, or any combination of these, that interprets and executes instructions defined by portions of computer program code. The memory 530 may comprise a random access memory (RAM) 532 and/or a read only memory (ROM) 534. The RAM 532 may store information and instructions in a form of portions of computer program code 532A-532N for execution by the processor 520. The ROM 534 may include a conventional ROM device or another type of a static storage device that is configured to store static information and instructions in a form of portions of computer program code 534A-534N for use by the processor 520. The RAM 532 and ROM 534 may be implemented with one or more corresponding memory elements.

The input means 540 may comprise a conventional mechanism that permits inputting information to the system 500, such as a keyboard, a mouse, a pen, a touch screen, voice recognition and/or biometric mechanisms, CD/DVD/Blue-ray drive etc. The output means 550 may comprise a conventional mechanism that outputs information, including a display, a printer, a speaker, etc. The input and output means are not necessarily implemented into the system 500, but may be coupled to the system 500 with some known interfaces either wirelessly or in a wired manner when needed. In some examples of the invention the system does not comprise any input means 540 or output means 550 as the system operates as a standalone entity, which is controlled externally through the communication interface 560.

The communication interface 560 may enable the system 500 to communicate with other elements and/or systems, such as networks, as well as with client terminals either directly or indirectly over a network.

The system 500 may perform the operations as described above in response to the processor 520 executing at least one instruction defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 560. The software instructions may cause the processor 520 to perform method steps and processes as described and thus to enable the operation of the system 500 according to an example of the invention.

As said, FIG. 5 illustrates an example of the system 500 according to the invention. The elements as disclosed in FIG. 5 do not necessarily exist in all implementations of the system 500. For example, the system 500 may not comprise input means 540 and output means 550, but the system 500 may be accessed through the communication interface 560 with applicable devices and systems. As well, the number and type of memories may vary. Further, the amount of portions of computer program code may depend on the implementation.

The system 500 is configured, by means of at least part of the mentioned elements, to implement the method according to an example of the invention. The system 500 may be any device that receives the content data as an input through e.g. the communication interface 560, performs the described method steps and returns or forwards the processed image content data further.

An example of the invention also relates to a non-transitory computer-readable storage medium, which stores at least portions of computer program code, wherein the portions of computer program code are computer-executable to implement the method steps in the system as described. In general, the computer-readable storage medium may include a storage medium or memory medium, such as magnetic or optical media e.g. disc, DVD/CD-ROM, volatile or non-volatile media, such as RAM.

The terminal device referred herein may be a mobile phone, laptop computer, tablet computer or any other similar client device which may utilize the delivered content in any manner, such as displaying it.

The invention provides great advantages since it optimizes the needed storage and concurrent computing resources in the system side. It also optimizes the capacity of the delivery path i.e. the communication channel in the case when the final rendering is configured to be performed by the terminal device for the content belonging to the second category. Moreover, the solution according to the invention provides multiple alternatives for output formats, as was discussed in the context of FIG. 4. Namely, it is possible to produce a single image, preferably with lossless PNG compression, by combining the raster canvas and final rendered information based on the contents of the meta file. Alternatively, it is possible to create two raster images wherein the complex graphics are arranged in the background raster canvas as a background lossy JPG and simple graphics, such as text and/or lineart, are arranged as an overlay image as lossless partially transparent PNG on top of the background raster image. Still further option is to create a background raster image e.g. as a lossy JPG and the text and/or lineart is represented on top of it with HTML+CSS+Webfonts technique. As an additional benefit, the last option enables client-side text zooming with good quality while minimizing the amount of data to be transferred to the client-side to enable such function.

Some advantageous embodiments according to the invention were described above. The invention is not limited to the embodiments described. The inventive idea can be applied in numerous ways within the scope defined by the claims attached hereto.

What is claimed is:

1. A computer-implemented method for preparing content of a document, the method comprising:
   receiving a document file as an input;
   parsing the content of the document file;
   classifying parsed content data items forming the content of the document file into at least two separate categories;
   for the classified parsed content data items:
      rendering the content data items classified in a first category into a raster canvas and storing the rendered content of the raster canvas into a raster image file, and
      generating and storing a meta file comprising at least one preprocessed rendering instruction for at least one content data item classified in a second category;
   receiving a request of content from an external entity;
   finalizing the meta file by rendering the at least one content data item classified in the second category into another raster canvas according to the preprocessed rendering instruction in response to a receipt of the request from the external entity; and
   delivering the rendered raster canvases to a recipient.

2. The computer-implemented method of claim 1, further comprising-rendering data stored in the meta file comprising the at least one preprocessed rendering instruction for the at least one content data item classified in the second category in response to a request from an external entity.

3. The computer-implemented method of claim 2, further comprising outputting the raster image file comprising the rendered content data items classified in the first category and the rendered meta file in one of the following manner: single raster image, layered separate raster images, raster image and textual and line art content expressed with HTML, CSS, and web font files.

4. The computer-implemented method of claim 1, further comprising delivering at least the generated meta file to an external party requesting the meta file for rendering.

5. The computer-implemented method of claim 1, wherein the classification of the parsed content data items forming the content of the document file into at least two separate categories is at least partly based on an analysis of a graphical complexity of each of the parsed content data items.

6. The computer-implemented method of claim 1, wherein the at least one preprocessed rendering instruction for the metafile is created by reducing the amount of information of the content data items in the second category that is needed to express the graphical representation so that all used coordinate values are converted to destination raster pixel coordinate values.

7. A system for preparing content of a document, the system comprising:
   one or more processors;
   a memory including computer program code, the memory and the computer program code being configured to, with the processor, cause the system at least to:
     receive a document file as an input,
     parse the content of the document file,
     classify parsed content data items forming the content of the document file into at least two separate categories,
     for the classified parsed content data items, the system is configured to:
       render the content data items classified in a first category into a raster canvas and store the rendered content of the raster canvas into a raster image file, and
       generate and store a meta file comprising at least one preprocessed rendering instruction for at least one content data item classified in a second category, and
     in response to receipt of a request of content from an external entity, the system is configured to:
       finalize the meta file by rendering the at least one content data item classified in the second category into another raster canvas according to the preprocessed rendering instruction in response to a receipt of the request from the external entity, and
       deliver the rendered raster canvases to a recipient.

8. The system of claim 7, wherein the system is further configured to render data stored in the meta file comprising the at least one preprocessed rendering instruction for the at least one content data item classified in the second category in response to a request from an external entity.

9. The system of claim 8, wherein the system is further configured to output the raster image file comprising the rendered content data items classified in the first category and the rendered meta file in one of the following manner: single raster image, layered separate raster images, raster image and textual and line art content expressed with HTML, CSS and web font files.

10. The system of claim 7, wherein the system is further configured to deliver at least the generated meta file to an external party requesting the meta file for rendering.

11. The system of claim 7, wherein the system is configured to base the classification of the parsed content data items forming the content of the document file into at least two separate categories at least partly on an analysis of a graphical complexity of each of the parsed content data items.

12. The system of claim 7, wherein the system is configured to create the at least one preprocessed rendering instruction for the metafile by reducing the amount of information of the content data items in the second category that is needed to express the graphical representation so that all used coordinate values are converted to destination raster pixel coordinate values.

13. A non-transitory computer readable medium for storing computer program code that, when executed by a system, causes the system to perform a method for preparing content of a document, the method comprising:
   receiving a document file as an input;
   parsing the content of the document file;
   classifying parsed content data items forming the content of the document file into at least two separate categories;
   for the classified parsed content data items:
     rendering the content data items classified in a first category into a raster canvas and storing the rendered content of the raster canvas into a raster image file, and
     generating and storing a meta file comprising at least one preprocessed rendering instruction for at least one content data item classified in a second category;
   receiving a request of content from an external entity;
   finalizing the meta file by rendering the at least one content data item classified in the second category into another raster canvas according to the preprocessed rendering instruction in response to a receipt of the request from the external entity; and
   delivering the rendered raster canvases to a recipient.

14. The non-transitory computer readable medium of claim 13, further comprising rendering data stored in the meta file comprising the at least one preprocessed rendering instruction for the at least one content data item classified in the second category in response to a request from an external entity.

15. The non-transitory computer readable medium of claim 14, further comprising outputting the raster image file comprising the rendered content data items classified in the first category and the rendered meta file in one of the following manner: single raster image, layered separate raster images, raster image and textual and line art content expressed with HTML, CSS and web font files.

16. The non-transitory computer readable medium of claim 13, further comprising delivering at least the generated meta file to an external party requesting the meta file for rendering.

17. The non-transitory computer readable medium of claim 13, wherein the classification of the parsed content data items forming the content of the document file into at least two separate categories is at least partly based on an analysis of a graphical complexity of each of the parsed content data items.

18. The non-transitory computer readable medium of claim 13, wherein the at least one preprocessed rendering instruction for the metafile is created by reducing the amount of information of the content data items in the second category that is needed to express the graphical representation so that all used coordinate values are converted to destination raster pixel coordinate values.

* * * * *